Sept. 26, 1950  B. G. COPPING  2,523,499
AUTOMATIC THERMOSTATIC REGISTER
Filed May 8, 1948  2 Sheets-Sheet 2
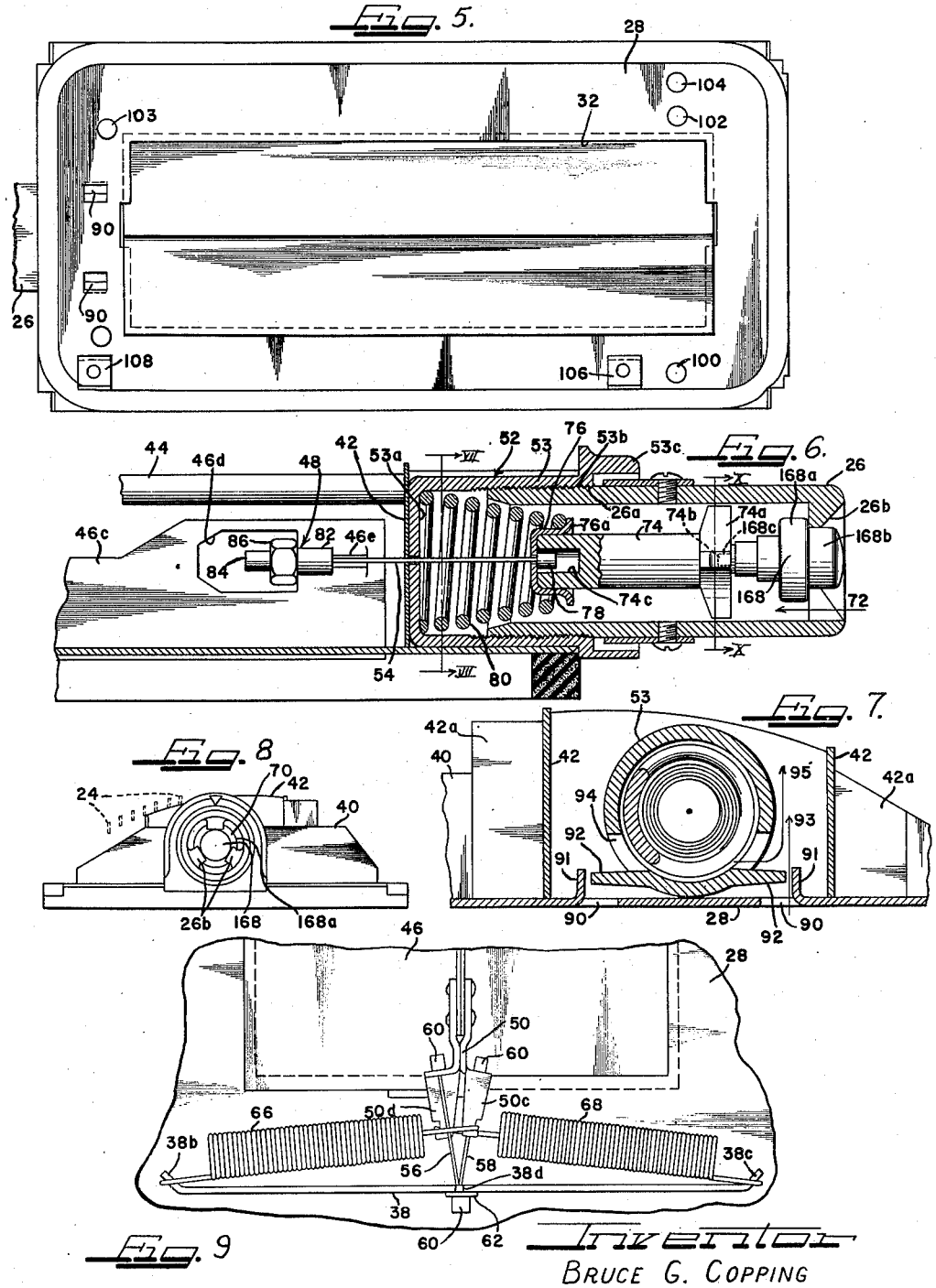
Inventor
BRUCE G. COPPING Patented Sept. 26, 1950

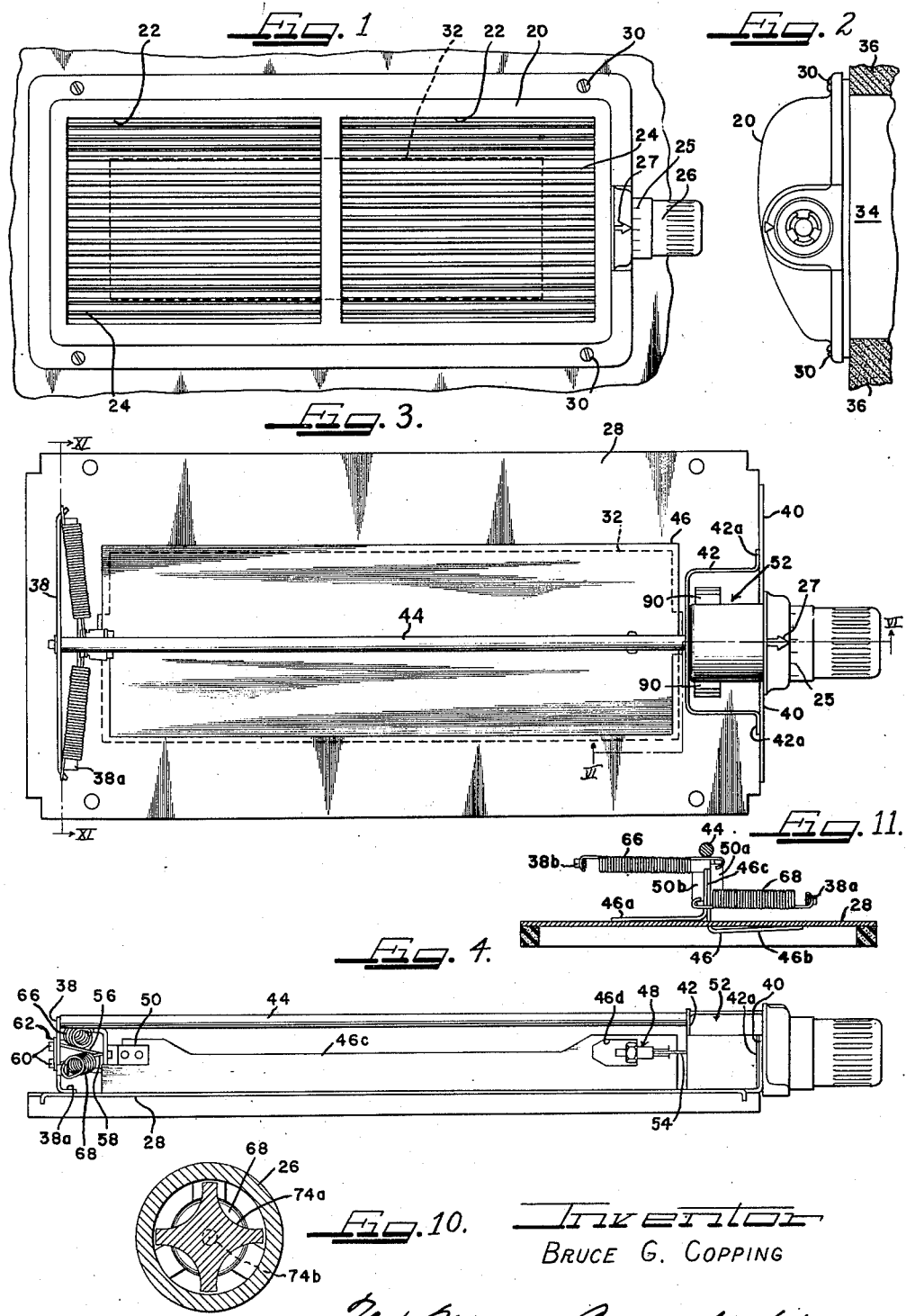

2,523,499

UNITED STATES PATENT OFFICE 2,523,499

AUTOMATIC THERMOSTATIC REGISTER

Bruce G. Copping, Atlanta, Ga., assignor to Don Manufacturing Company, Chicago, Ill., a corporation of Illinois Application May 8, 1948, Serial No. 25,838

7 Claims. (Cl. 236—49)

This invention relates to an improvement in automatic registers and more particularly an automatic register of the type intended for use in warm air home heating systems of the forced air type.

The present subject matter constitutes a continuation-in-part of that disclosed in my copending application, Serial No. 708,224, filed November 7, 1946.

In one form of heating system, air under pressure is applied to appropriate ducts which lead to a plurality of rooms or spaces to be heated. Each duct is provided with one or more registers to control the quantity of air passing therefrom into the rooms. These registers each comprise a frame defining an opening leading from the appropriate duct to the room or space and a shutter is interposed in this opening to control the quantity of air flow therethrough. The registers contain automatic elements and operate in response to the temperature of the air in the room to open and close the shutter to control the quantity of air admitted thereto in such fashion as to maintain constant the temperature therein.

One requirement of an effective automatic register is that the position of the movable shutter be varied in accord with the temperature of the room or space being heated. To this end, it is necessary to expose the thermostatic control element to a temperature representative of this temperature as distinguished from the temperature of the air entering the room. As the temperature of the air entering the room through the ducts influences the temperature of the thermostatic control element, the shutter will naturally tend to close and thereby defeat its own purpose.

A further requisite of an effective automatic register is that a sturdy structure capable of operating without deflecting or bending be provided so that compensating movements which would defeat the movements of the temperature sensitive element do not and can not take place. This requirement is of particular importance where the control element is of a type capable of only limited movement.

Still another requirement of an effective automatic register for use in homes is that it be of simple construction and reliable operation as well as being of low cost and, moreover, that the complete unit be adaptable for convenient mounting in a home.

It is therefore a general object of the present invention to provide an improved automatic register.

Further, it is an object of the present invention to provide an improved automatic register suitable for use in heating homes.

Yet another object of the present invention is to provide an improved automatic register wherein the thermostatic control element partakes of the average air temperature in the room or space being heated.

Still another object of the present invention is to provide an improved aspirator structure for an automatic register.

It is yet another object of the present invention to provide an improved automatic register having a sturdy structure suitable for use with a control element having limited movement.

It is further an object of the present invention to provide an improved automatic register capable of being readily installed in a house or other structure.

It is still another object of the present invention to provide an improved automatic register having features of construction, combination, and arrangement providing a unitary structure capable of effectively controlling the admission of air to a room or space.

Certain features of the ventilator herein described are described and claimed in my copending application, Serial No. 25,837 filed May 8, 1948, assigned to the same assignee as the present invention.

The novel features which I believe to be characteristic of my invention are set forth with particularity in the appended claims. My invention, itself, however, both as to its organization and method of operation may best be understood by reference to the following description taken in connection with the accompanying drawings in which:

Figure 1 is a front elevational view of an automatic register constructed in accordance with the present invention as it appears when mounted on a wall;

Figure 2 is an end elevational view of the register of Figure 1;

Figure 3 is a front elevational view of the register of Figure 1 with the cover plate removed;

Figure 4 is a view of the register like Figure 3 but from below;

Figure 5 is a view of the register like Figure 3 but from the rear;

Figure 6 is an enlarged cross sectional view through the axis VI—VI, Figure 3;

Figure 7 is a cross sectional view through the axis VII—VII, Figure 6;

Figure 8 is a view like Figure 3 but from the right hand end of the register as seen in that figure;

Figure 9 is an enlarged fragmentary view of the left-hand edge portion of Figure 3 showing the spring supports for the shutter mechanism;

Figure 10 is a cross sectional view through the axis X—X, Figure 6; and

Figure 11 is a cross sectional view through the axis XI—XI, Figure 3.

Referring now to the front and side views of Figures 1 and 2, the register of the present invention comprises a housing 20 having a pair of spaced rectangular openings 22 each of which is closed by a plurality of spaced louvers 24. As seen from the side, the housing 20 is of rounded shape to define a pleasing appearance.

A temperature control knob 26 extends from the end of the housing 20 and, as will be described in further detail hereafter, may be adjusted to control the flow of air through the windows or openings 22 to accomplish any predetermined room temperature. This is achieved by aligning an indicator arrow 27 with a desired temperature mark 25.

The housing 20 is supported from a back plate 28, Figure 3, by a plurality of screws 30. The back plate 28 has a centrally disposed rectangular opening 32, Figure 3, which defines a passage in conjunction with the openings 22, Figure 1, through which air from a duct 34, Figure 2, passes to the room or space to be heated.

As shown in Figure 2, the housing 20 is supported over the opening of the duct 34 by any suitable means such as, for example, screws extending through the openings in the back plate 28 into a supporting wall 36.

As is best shown in the views of Figures 3, 4 and 9, a support plate 38 is mounted on one end of the back plate 28 in registry with the opening 32, this support plate having a bottom flange 38a, Figure 4, welded or otherwise attached to the back plate 28. At the opposite end of the back plate 28, the end portion of that plate is upturned to form the support plate 40. A U-shaped baffle plate 42 is attached to the support plate 40 by its toe portions 42a and defines a chamber in conjunction with the support plate 40 through which air may travel from the duct 34 to the room or space being heated without traveling through the opening 32.

From the view of Figure 1 it will be evident that the louvers 24 extend beyond the edge of the opening 32 of the back plate 28 and over the duct defined by the baffle 42 and the upturned support plate 40. Moreover, as is shown best in Figure 8, the baffle 42 is shaped for mating engagement with the louvers 24 as indicated by the dotted lines of Figure 8 which show the position assumed by these louvers when the housing 20 is in position. Thus the baffle plate 42 defines a completely independent passageway for air flow from ducts 34 to the room or space being heated without regard to the position of the shutter or the pressure drop across the louvers 24 in the region over the opening 32.

The provision of a completely separate and independent air path from the duct 34 to the room or space being heated provides a particularly effective method of maintaining the inward air flow through the aspirator duct defined by the housing 53. As will be evident to those skilled in the art, the louvers 24 interpose a substantial resistance to the flow of air from the duct 34 to the room or space being heated and consequently there is a substantially increased pressure in the region between the shutter 46 and the louvers 24 in the region directly over the opening 32. If the aspirator opens into this air this pressure tends to oppose the aspirator action and under normal conditions reverse air flow will occur. Such reverse air flow would follow the path from the region between the shutter 46 and the louvers 24 through the aspirator passageways and into the room or space and thus would heat the control element 168 in accord with the duct air temperature rather than the room air temperature.

In the independent passageway defined by the baffle plate 42, the area of louvers 24 through which the air can escape is large compared with the area of the ports 90 through which air enters from duct 34, thus the pressure drop through the louvers 24 is very slight and no back pressure is built up to force a reverse air flow through the housing 53.

A rod 44, Figure 3, extends between the baffle 42 and the support plate 38 bearing at one end against the housing 53 to take up the pressure therebetween and supplement the back plate 28 in resisting the forces associated with operation of the register.

A shutter 46, Figures 3 and 11, is positioned across the opening 32. This shutter is supported for rotation about an axis through a rib portion 46c by a cord suspension to be described in further detail hereafter.

As is best shown in Figure 11, the shutter 46 is made up of two metal sheets of L-shaped cross section and identified as 46a and 46b, Figure 11. One leg of each of these sheets is spot welded or otherwise attached to the corresponding leg of the other to define the rib 46c extending the length of the shutter 46. A window, 46d, Figure 4, is provided at one end of this rib and receives the calibrating mechanism shown generally at 48. A tab 50 is attached to the opposite end of the rib 46c.

As will be described in further detail hereafter, the chamber defined by the baffle 42 contains a temperature control assembly indicated generally at 52. This assembly tensions a cord 54, Figure 4, in accord with the temperature in the room or space being heated, the amount of this tension increasing as the room air temperature falls.

The tab 50 is attached to a cord suspension which operates to sustain the shutter 46 in position and which, in addition, rotates that shutter in accord with the tension on the cord 54. As will be evident from the greatly enlarged fragmentary view of Figure 9, this suspension includes a pair of cords 56 and 58 which are anchored at their opposite ends to the support plate 38 and the projecting finger portions 50c and 50d of tab 50. The cords 56 and 58 are preferably made of 21 strand stainless steel aircraft type cable which has relatively small opposition to bending and twisting. Anchors 60 are press fitted on the opposite ends of the cords 56 and bottomed against suitable openings in the tab 50 and the support plate 38 to anchor the cords 56 and 58 in position. As a means of simplifying the assembly, the anchors 60 located adjacent the support plate 38 bear against suitable openings in an auxiliary support plate 62 and the support plate 38 is provided with a lengthy slot 38d in which the assembly of auxiliary plate 62 and cords 56 and 58 may be inserted. The slot 38d also defines an anchor for the reduced end portion of the bar 44, thus sustaining that bar in place while at the same time permitting it to bottom against the plate 38.

From Figures 3, 4 and 9, it will be evident that the cords 56 and 58 are spaced in direction perpendicular to the shutter 46 by the auxiliary support plate 62 and are spaced in direction parallel to the shutter 46 by the tab 50 which anchors these cords to that shutter. Consequently, the cords 56 and 58 define a twisted plane and when these cords are tensioned, they exert torque tending to rotate the shutter 46 in direction to align the points of attachment of the cords 56 and 58 in a single plane.

Tension on the cords 56 and 58 is exerted by tension on the cord 54 which is attached to the shutter 46 by a calibrating assembly 48.

A pair of coil springs 66 and 68 also extend between the tab 50 and the support plate 38. The spring 68 is hooked over a bent-over tab 38c of plate 38 and the spring 66 is hooked over the bent-over tab 38b of the plate 38. As is best seen in Figure 4, the tab 38a is located relatively close to the back plate 28 and the tab 38b is located a relatively further distance therefrom. The springs 66 and 68 are hooked to the extensions 50c and 50d of the tabs 50a and 50b, respectively, of tab 50. These extensions extend in the direction of the axis of rotation of the shutter 46 as will be evident from Figure 9.

From the figures it will be evident that the springs 66 and 68 exert torque tending to rotate the shutter 46 in direction opposite the direction of rotation associated with torque caused by tensioning the cords 56 and 58. Thus the springs 66 and 68 act to close the shutter 46 against the torque of cords 56 and 58 and to tend to hold the shutter in the closed position shown in Figure 3.

The elements comprising the temperature control assembly 52, Figure 3, and the temperature control knob 26 are seen best in Figure 6, which is a cross sectional view through the axis VI—VI, Figure 3. The housing 53 is of die cast construction and is of generally cylindrical shape with a wall 53a in abutting relationship with the baffle plate 42. At the end opposite wall 53a, the interior of housing 53 is threaded as indicated at 53b and terminates in an annular lip 53c which surrounds the temperature adjusting knob 26 and has the arrow 27, Figure 3, formed at a fixed point thereon.

The temperature adjusting knob 26 is of molded plastic construction and at one end bears threads 26a which are received in threaded engagement by the threads 53b of the housing 53 to sustain the temperature control knob in position and to permit adjustment of the position thereof. At the end opposite threads 26a, the temperature adjusting knob 26 terminates in a plurality of inwardly extending ribs 26b which may be seen in end view in Figure 8. These ribs engage the wall defined by the enlarged portion 68a of the temperature sensitive element 168 and terminate in radii corresponding to the radius of the reduced end portion 168b of that element. This forms a snug seat against which the element 168 bottoms.

Open spaces 70, Figure 8, are formed between the adjacent ribs 26b. These spaces define passages for air flow through the temperature adjusting knob 26 as indicated by the arrow 72, Figure 6.

The spacer 74 comprises a generally cylindrical rod of molded plastic material such as, for example, "Bakelite" and terminates at end 74a in a wing portion having a plurality of radially extending ribs which engage the interior of the temperature control knob 26 to sustain the spacer 74 therein. The end 74a further has a recess 74b to receive the piston 168c of the temperature senstive element 168.

At an end opposite wing 74a, the spacer 74 has a cavity 74c. Moreover, the cap 76 fits over the end of spacer 74 and about the cavity 74c. This cap is of drawn metal construction and has a centrally disposed opening through which the cord 54 passes. A tab 78 is press fitted on the end of cord 54 and bottoms against the cap 76 to hold that end of cord 54. The cavity 74c is of size freely to receive the tab 78.

The edge portions 76a of a cap 76 are bent over to define an annular wall against which the small end of the compression spring 80 bottoms. The large end of this spring bottoms against the wall 53a of the housing 53 and thus urges the cap 76, the spacer 74, and the temperature sensitive element 168 against the ribs 26b of the temperature control knob 26. This action of spring 80 holds the elements within the housing 53 and the temperature control knob 26 snugly in place and, moreover, tensions cord 54 in accord with the differential between the force exerted by the temperature sensitive element 168 and the compressive force of spring 80.

Temperature sensitive element 168 may be any one of various devices having a dimension varying in accord with temperature. Preferably this element is of the so-called "Vernet" type wherein a change in volume of a material during its transformation from one physical state to another is utilized to effect change in dimension of the control element. It is, of course, a well known fact that a change in volume takes place in most materials upon change from a solid to a liquid state or from a liquid to a gaseous state. These elements utilize such volume changes to effect a change in a dimension thereof throughout a predetermined temperature range. In the specific type of "Vernet" element shown in the drawings, Figure 6, the piston 168c moves outward or to the left in Figure 6 with increasing temperature and inward with decreasing temperature.

The end of cord 54 opposite the end to which tab 78 is fitted is attached to the rib portion 46c of the shutter 46 by the calibrating assembly 48. This assembly includes a collar 82, Figure 6, of brass or similar material having a central opening to receive the cord 54 and which is slotted to receive the rib 46c of the shutter 46 in the portions adjacent the extended slot portion 46e of a window 46d. Tab 84 is press fitted to the end of cord 54 and bottoms against the end of the collar 82. The end of collar 82 adjacent the tab 84 is threaded and receives the nut 86 in threaded engagement. This nut bottoms against the edge of the window 46d to sustain the entire assembly, including collar 82, tab 84 and cord 54, in fixed relationship to the rib 46c.

The back plate 28 has a pair of bent-up tab portions 91, Figure 7, which define openings 90 permitting passage of air in the direction of arrow 93 from the duct 34 to the chamber defined by the baffle plate 42 and from this chamber into the room or space being heated. As is seen best in Figure 5, the openings 90 are substantially square shaped. The die cast housing 53 has a pair of ears 92 which extend partially across the openings 90 as indicated in Figure 7. These ears are in the form of tabs which define openings 94 in the housing 53. As indicated by the arrow 95, air flow may take place from within the housing 53 and through the openings 94 to join the air stream passing through the openings 90.

The tabs 91 and 92, together with the openings 90 and 94 define an aspirator structure which creates a low pressure region adjacent the openings 94 and draws air through the housing 53 and the temperature control knob 26 as indicated by the arrow 72, Figure 6. It will be observed that the upturned portions of tabs 91 guide the air directly past the tabs 92 in a manner most favorable to production of high velocity and a low pressure area behind the tabs 92 and adjacent windows 94. This low pressure area effectively draws air through the knob 26 and causes the temperature control element 168 to partake of the average air temperature in the room or space being heated as distinguished from the temperature of the air in the duct 34.

The operation of the register of the present invention will be apparent from the foregoing description. Air under pressure in duct 34, Figure 2, travels through the openings 90 into the chamber defined by the baffle 42, and thereby induces air currents following the arrow 72 through the temperature adjusting knob 26 and the housing 53. These air currents cause the temperature sensitive element 168 to partake of the average air temperature in the room or space being heated. If this air temperature falls below the temperature at which the knob 26 is set, the temperature sensitive element 168 experiences reduced length, thereby causing the entire assembly including spacer 74, cap 76 and the end of spring 80 to extend in the right-hand direction, Figure 6. This tensions the cord 54 and imparts corresponding tension to the cords 56 and 58, thereby imparting torque to the shutter 46 and causing the latter to rotate in direction to permit more air flow from the duct 34 through the opening 32, Figure 3. This opening operation will continue until the position of the shutter 46 is such that the heat carried by the air entering the room is equal to the heat lost therefrom, thereby attaining the temperature desired.

The function of the calibrating assembly 48 is to fix the position of the shutter 46 at a preselected position of the temperature control knob 26. The latter includes a series of temperature numbers 25 for registry with the pointer 27 which is formed in the housing 53. It is, of course, substantially impossible to manufacture a precision instrument such as the register of the present invention in mass production without encountering substantial variations between individual units insofar as the temperature calibration is concerned. To attempt to overcome this problem by the use of more accurate springs 80, 66 and 168, together with closer dimensional tolerances, is uneconomical and would increase the cost of the unit beyond the justifiable cost.

The calibrating assembly 48 overcomes this problem for the nut 86 may be adjusted relative to the collar 82 until, with the knob 26 set at a predetermined position, the shutter 46 is held in an intermediate position when the element 168 is at the temperature corresponding to the setting of the knob 26. When this adjustment has been made a drop of cement may be placed on the portion of the nut 86 adjacent the collar 82 to prevent loss of calibration due to accidental rotation of the nut 86.

The amount of motion of the piston 168c of the temperature sensitive element 168 per degree of temperature change is affected by variations in the pressure against which the piston is working. If the reacting pressure increases as the piston moves outward to the left, then the amount of travel per degree of temperature change is lessened. Conversely, if the piston moves out against a decreasing resistance, then the amount of travel per degree of temperature change is increased.

As the temperature falls, the reacting spring pressure forces the piston back. If this returning pressure decreases as the piston backs in, then the amount of backward motion per degree of temperature drop is lessened. If, on the other hand, the returning pressure increases as the piston backs up, then the amount of backward motion per degree of temperature drop is increased. Thus, for maximum motion of the piston, both outward and inward, the pressure against which the piston is working should be least in the outward position and greatest in the inward position.

The springs 66 and 68 exert a torque on the shutter 46, and through the action of the cords 56 and 58 this torque is translated into tension on the cord 54, which tension opposes the force of the spring 80. Thus, the net pressure against the piston 168c is the pressure of the spring 80, minus the tension on the cord 54 resulting from the torque of the springs 66 and 68.

By suitable arrangement of the angularity of the tabs 50c and 50d, the torque exerted by the springs 66 and 68, may be made to decrease as the shutter opens to such an extent that the natural increase of force in the spring 80 is more than offset, and the desired reduction of reacting pressure as the piston moves out is obtained. This operation is described in detail in my copending patent application, Serial No. 25,837 filed May 8, 1948, assigned to the same assignee as the present invention.

By providing the rod 44, Figure 3, the support plate 38, and hence the anchors of cords 56 and 58, are held against shifting movement relative to the back wall 53a of the housing 53 against which the spring 80 bottoms. Inasmuch as a substantial tensioning force must be exerted by the cord 54 to overcome the bias of springs 66 and 68, there is a substantial compressive force exerted on the back plate 28, a force that inherently tends to buckle that plate and shift the support plate 38 to defeat the purpose achieved by the shifting movement of spacer member 74. Rod 44 overcomes these effects without requiring heavier construction of the back plate 28 and without interfering with the operation of the control elements or the rotation of the shutter. Moreover, the rod 44 extends substantially between the points of application of the tensioning forces and accordingly acts in the most efficient manner in supplementing the action of the back plate 28.

The back plate 28 is provided with a plurality of mounting openings 100, 102, 103 and 104, Figure 5, together with a pair of angle brackets 106 and 108. These coact to enable convenient mounting of the shutter in either a four inch, a five inch, or a six inch duct. Ducts of these dimensions are standard in building construction and the provision of these openings permits application of the register in a manner that would otherwise require a great number of frame sizes, and would correspondingly increase the expense thereof. When the register is used with a five or six inch duct, the brackets 106 and 108 are rotated as shown in Figure 5 and the mounting screw is inserted through the opening 104 which leaves ample room for the six inch duct and suitably centers the opening 32 relative to the duct. On the other hand, when a four inch duct is encountered the brackets 106 and 108 are rotated 180° to the position shown in the dotted lines of Figure 5, thereby causing the opening 32 to be aligned with the duct when the brackets 106 and 108 are bottomed against the edge of the duct. The opening 102 may be used to fasten the shutter in position in the four inch duct.

Rubber grommets or inserts may be provided to close the unused openings 100, 102 or 104.

The foregoing universal mounting is achieved by spacing the centers of rotation of the brackets 106 a distance of approximately two and three-eighths inches from the center of the opening 32 and by positioning the upstanding portions of these brackets approximately one-fourth inch from the centers of rotation.

In actual automatic thermostatically controlled shutter built in accordance with the principles of the present invention the marks 25 are spaced approximately three-eighths of an inch and represent 2½° F. difference in room temperature. This variation in room temperature corresponds to approximately 0.014 inch of travel of the member 74 and corresponding movements of the cord 54. This movement is sufficient to rotate the shutter 46 through an angle of approximately 45° and moves the tip of the shutter blade approximately an inch and one-half. Thus an original motion of .014 inch is converted into actual shutter opening motion of one and one-half inches or one hundred times as much motion as the thermostatically controlled element itself is capable of making. This tremendous step up in motion, achieved without substantial frictional losses, accounts for the unusual effectiveness of the shutter of the present invention. Moreover, to get a similar multiplication of motion without back lash and lost motion would require precision machinery increasing the cost of the register to a prohibitive value. While I have shown a particular embodiment of my invention, it will, of course, be understood that I do not wish to be limited thereto since many modifications both in the elements employed and their cooperative structure may be made without departing from the spirit and scope of my invention. I, of course, contemplate by the appended claims to cover all such modifications as fall within the true spirit and scope of my invention.

What I claim as new and desire to secure by Letters Patent of the United States is:

1. In an air flow controller, a duct through which air is carried into a room, a shutter for controlling the flow of air from the duct into the room, a grille outside the shutter which impedes such air flow, a thermostat for controlling the position of the shutter, a tube around the thermostat and having an air inlet independent of the duct in communication with the room atmosphere and an aspirating passage behind the grille and isolated from the duct, said passage communicating with said tube and carrying a limited high-velocity, low-pressure flow of air from the duct to draw air from the room through said tube over the thermostat.

2. A temperature conditioning air flow apparatus of the type including a thermostatically controlled damper structure in control of air flow through a duct carrying temperature conditioned fluid comprising, a thermostat directly adjacent the duct to control the position of the damper in the duct, a fluid chamber to one side of the damper having a restricted opening to the duct and a larger opening to the atmosphere outside the duct to receive an increased velocity, reduced pressure flow of temperature conditioned fluid from the duct, and means defining a separate aspirator passage along the thermostat and having one end communicating with the atmosphere outside of the duct and having the other end communicating with said fluid chamber, whereby the higher velocity fluid flowing through said chamber will induce a flow of atmospheric fluid through said passageway about the thermostat.

3. In an air flow control apparatus of the type including a duct with a thermostatically operated shutter at the end thereof for controlling the flow of air to a room, the improvement of a frame at the end of the duct and baffle elements projecting from the frame and together therewith forming a flow passage independent of the main duct outlet into the room, said flow passage having a restricted duct inlet and a proportionally greater room outlet, whereby air at duct pressures will pass through said duct inlet and through said flow passage at increased velocity and reduced pressure, and an open ended casing for the thermostatic control elements, said casing having one end thereof communicating with said flow passage and having the other end thereof communicating with said room, whereby air from the room will be aspirated through the casing into the flow passage for exposing the thermostatic control elements to room temperature.

4. An air flow control apparatus according to claim 3 wherein the frame is a flat plate-like element having a main air flow aperture and having an opening adjacent thereto forming the flow passage duct inlet and the baffle elements are arranged on the flat plate-like element relative to said flow passage inlet opening to form the independent flow passage isolated from the main air flow through the duct into the room.

5. An air flow control apparatus according to claim 4 and further characterized by the provision of a grille extending substantially across the register and disposed in front of the main air flow aperture and the independent flow passage.

6. In an air flow control apparatus of the type including a duct which has a thermostatically-operated, shutter-controlled register at the end thereof for controlling the flow of air into a room, the improvement of an aspirator structure for exposing the thermostatic control elements to room temperature comprising a register frame, means carried thereby and defining therewith an independent flow passage, said flow passage having a restricted duct inlet and a proportionally greater room outlet whereby air at duct pressure will pass through said duct inlet to produce a high-velocity, low-pressure flow of air in the flow passage and a housing for the thermostatic control element communicating with the flow passage and with the room whereby air from the room may be aspirated through the housing into the flow passage for the purposes set forth.

7. In a register structure including a frame and a damper for regulating flow of duct fluid through the same, an adjustable thermostat connected to said damper for actuating it in response to room temperature changes, said thermostat being on the exterior of the register frame in a manually accessible position, means defining an aspirating passageway along at least a part of the thermostat and means in communication with the duct fluid for inducing a flow of room temperatured air through said passageway.

BRUCE G. COPPING.

REFERENCES CITED

The following references are of record in the file of this patent:

UNITED STATES PATENTS

| Number | Name | Date |
|---|---|---|
| 32,897 | Sexton | July 23, 1861 |
| 471,681 | Collins | Mar. 29, 1892 |
| 1,054,266 | Bailey | Feb. 25, 1913 |
| 1,672,496 | McFarland | June 5, 1928 |
| 1,833,950 | Modine | Dec. 1, 1931 |
| 2,241,108 | Akers | May 6, 1941 |